United States Patent [19]

St. John et al.

[11] 3,819,212

[45] June 25, 1974

[54] FLARED FERRULE TUBE END FITTING

[75] Inventors: Peter A. St. John, Adelphi; Herbert Goldsmith, Rockville, both of Md.

[73] Assignee: Baxter Laboratories, Inc., Morton Grove, Ill.

[22] Filed: Jan. 5, 1973

[21] Appl. No.: 321,279

[52] U.S. Cl............... 285/356, 285/351, 285/369
[51] Int. Cl............................................. F16l 17/00
[58] Field of Search .......... 285/220, 171, 356, 357, 285/369, 348, 351

[56] References Cited
UNITED STATES PATENTS

| | | | |
|---|---|---|---|
| 2,788,992 | 4/1957 | De Vienne et al............. | 285/220 X |
| 2,958,548 | 11/1960 | De Vienne et al............. | 285/356 X |
| 3,498,644 | 3/1970 | Davies et al................... | 285/220 X |

*Primary Examiner*—H. Hampton Hunter
*Attorney, Agent, or Firm*—Herman L. Gordon

[57] ABSTRACT

A fitting assembly for joining small-diameter tubing to other tubing or to various other fittings or fixtures. The assembly consists of a threaded bushing of metal or plastic, a stainless steel washer, an elastomeric O-ring, and a deformable flared ferrule. The unaltered tubing extends through the bushing, washer, O-ring and ferrule. The assembly is screwed into a threaded port coupling or fitting with a flat bottom. Sealing is accomplished by the pressure of the constrained O-ring, forcing the flared ferrule against the bottom of the port, and similarly, the radial pressure of the O-ring seals the ferrule to the tubing wall, deforming the tube slightly. The stainless steel washer serves to constrain the O-ring and to decouple the torque exerted by the bushing.

10 Claims, 4 Drawing Figures

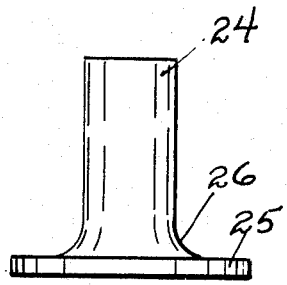
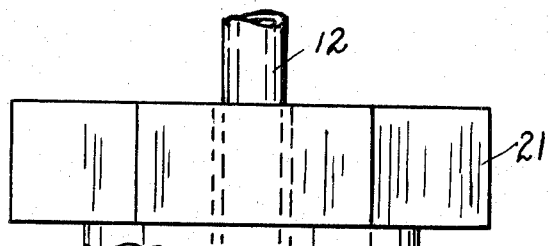
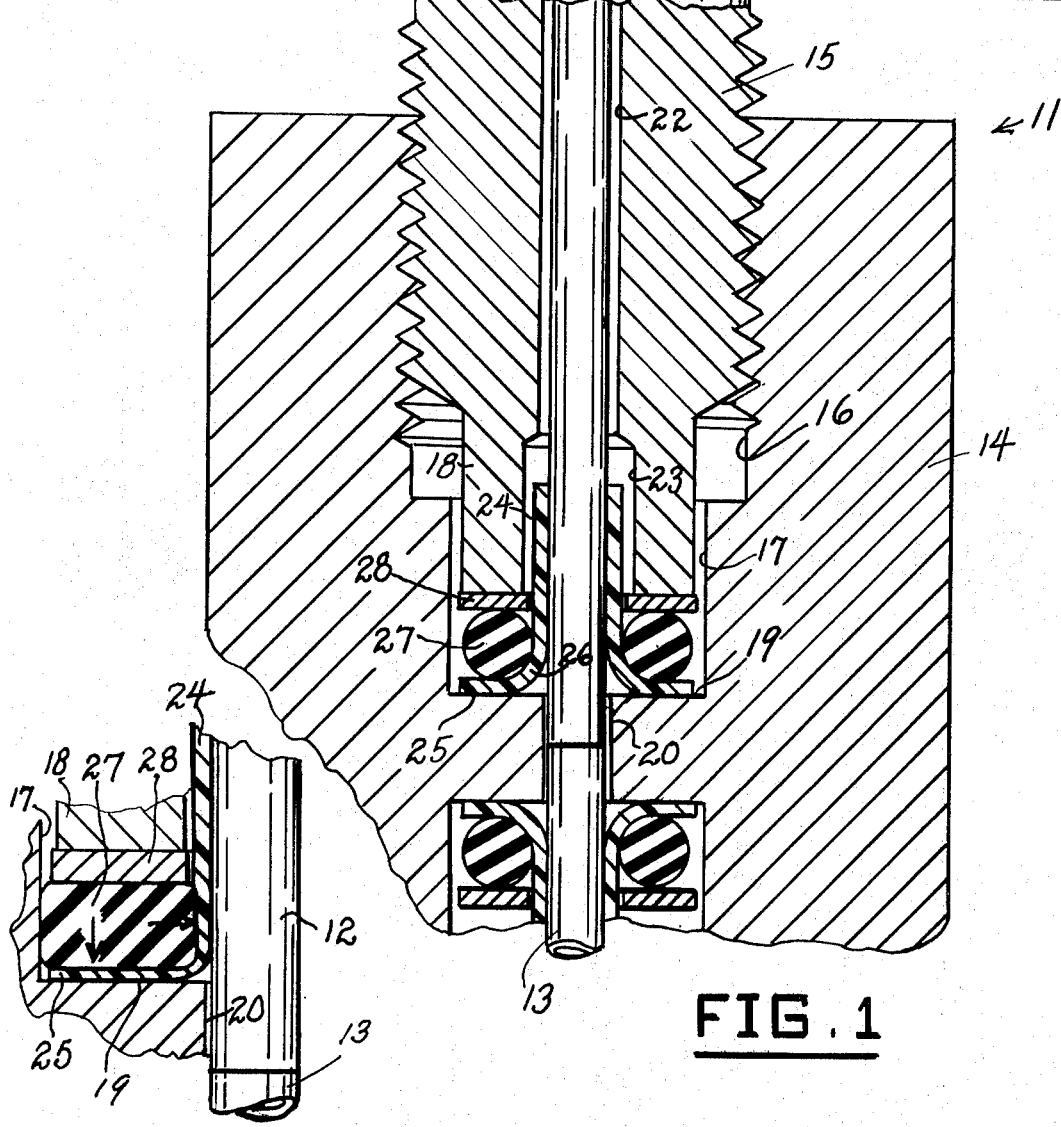

FLARED FERRULE TUBE END FITTING

This invention relates to tube coupling devices, and more particularly to a fitting assembly for joining a small-diameter tube to another tube or to another fitting or fixture.

A main object of the invention is to provide a novel and improved assembly for connecting small tubes to other tubes or devices without resorting to the use of permanent swaged-on bushings or ferrules or to the use of permanent flanges formed on the tubes, the connecting assembly involving very simple components, being easy to install, and requiring no complex tapered seats such as are used in self-swaging fittings or AN-type fittings.

A further object of the invention is to provide an improved coupling assembly for tubes, the assembly using relatively inexpensive components, providing a securely sealed joint, and employing a ferrule element which sealingly engages both the associated tubing wall and bushing seat, effectively preventing any solvent from coming into contact with the deformable O-ring of the assembly, thereby providing an exceptionally clean and inert system.

A still further object of the invention is to provide an improved tube coupling assembly which does not require any difficult machining steps, such as forming O-ring grooves or tapered seats, and which does not include any high-tolerance components, which employs a flared ferrule element which can be made of any of a wide range of different materials and is not limited to the same material as the associated tube, and which uses components which are well suited for volume production, employing no complex shapes and requiring no high-precision tolerances.

A still further object of the invention is to provide an improved tube coupling assembly wherein the components are not permanently deformed by the assembly and which are therefore reusable indefinitely, and wherein the components are not captivated by the associated tubing and can be removed as often as necessary.

A still further object of the invention is to provide an improved tube coupling fitting which does not require any special flaring or swaging equipment to assemble the fitting, and which has inherently low dead volume, since the seal is made against the outer diameter of the associated tube, and wherein the tube can be extended any distance past the sealing ferrule.

Further objects and advantages of the invention will become apparent from the following description and claims, and from the accompanying drawings, wherein:

FIG. 1 is an enlarged fragmentary vertical cross-sectional view taken through an improved tube coupling assembly constructed in accordance with the present invention, prior to tightening to a sealing condition.

FIG. 2 is an elevational view of the sealing ferrule element employed in the tube coupling assembly of FIG. 1.

FIG. 3 is a top plan view of the ferrule element of FIG. 2.

FIG. 4 is an enlarged fragmentary vertical cross-sectional view illustrating the pressure-distributing action of the O-ring and the action of the ferrule element when the tube coupling assembly is tightened to a sealing condition.

Referring to the drawings, 11 generally designates a typical fitting assembly according to the present invention, for joining a first small-diameter tube 12 to a second tube 13. The fitting assembly 11 comprises a main body 14 of suitably rigid material, such as metal or plastic. For this particular application of the invention, namely, for communicatively connecting a pair of tubes 12 and 13, the main body may be formed with aligned top and bottom structure to receive the tubes 12 and 13, this structure being substantially identical. Therefore, only the top structure will be described herein, namely, the structure for receiving tube 12.

Designated at 15 is an externally threaded bushing member threadedly engaged in a main bore portion 16 formed in body 14, said main bore portion communicating with a reduced lower bore portion 17 and the bushing member having a corresponding reduced lower portion 18 received in reduced bore portion 17. Lower bore portion 17 has the annular bottom wall 19 with a central aperture 20. The bushing member 15 has an enlarged hexagonal top head 21 and a central bore 22, said central bore being enlarged in the lower bushing portion 18, as shown at 23.

The tube 12 extends through the central bore of bushing member 15, and its bottom end may be received in the aperture 20, as shown in FIG. 1. A sleeve-like flared ferrule member 24 of somewhat resilient deformable material, such as Teflon, of the like, closely surrounds the lower end portion of tube 12, the ferrule member having a bottom flange 25 which engages the annular bottom wall 19. The ferrule member 24 has a normal annular radius portion 26 between the cylindrical main sleeve portion thereof and the bottom flange 25. An O-ring 27 of resilient deformable material, such as Neoprene, rubber, or the like, is seated around the annular radius portion 26, and a stainless steel flat washer 28 surrounds the ferrule member and is interposed between the bottom end of the cylindrical reduced lower bushing portion 18 and the O-ring 27.

When the bushing member is tightened, the tightening force is transmitted to the O-ring via the washer 28, causing the O-ring to be compressed and to substantially fill the annular space around the radius portion 26 and to act as a non-compressible fluid, squeezing the radius portion 26 against the tube 12, in the manner shown in FIG. 4, and forcing the flange 25 into tight sealing engagement with bottom wall 19. The inward squeezing action deforms the tube 12 slightly but assures a tight seal between said tube and main body 14.

As will be apparent from FIG. 4, the amount of dead volume between tube 12 and bottom wall 19, including the aperture 20, is quite small, and the O-ring 27 is completely sealed with respect to said dead volume, thereby preventing any of the transmitted fluid from coming into contact with said O-ring. It will be seen from FIG. 4 that the distortion of the O-ring 27 and the radial inward pressure generated therein causes the annular radius 26 to be somewhat reduced, due to the resilient deformation of the material of ferrule 24, which substantially reduces the dead volume between the tube 12 and the bottom wall 19.

The sealing action for the mating tube 13 is the same as that above described, in the particular embodiment illustrated in the drawings.

The material employed for the ferrule 24, such as Teflon, or the like, has good recovery characteristics, so that if the fitting is subsequently disassembled, the ferrule may be satisfactorily reused.

The structure above described may be employed not only for joining two pieces of tubing, but also for connecting a tube to various other fittings or fixtures.

The stainless steel washer 28 serves to confine and constrain the O-ring 27 and to decouple said O-ring from the torque exerted by the bushing member 15.

While a specific embodiment of a fitting assembly for joining small-diameter tubing to other tubing or to other fittings or fixtures has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A tube end fitting assembly comprising a body member formed with an internally threaded port having a bottom seat, a rigid bushing member threadedly engaged in said port and having a central bore for receiving a tube end, a sleevelike ferrule member of yieldable material slidably engageable with the tube end and disposed in the bottom portion of said port, said ferrule member having an annular bottom flange engaging said bottom seat, a ring member of resilient deformable material surrounding said ferrule member and engaging said flange, and a rigid washer member surrounding said ferrule member and disposed between the bottom end of said bushing member and said ring member for transmitting tightening force from said bushing member to said ring member and for causing said ring member to deform sufficiently to transmit inward radial sealing force on said ferrule member.

2. The tube end fitting assembly of claim 1, and wherein said ring member comprises an O-ring.

3. The tube end fitting assembly of claim 2, and wherein said sleevelike ferrule member has an annular radius portion between said flange and the main portion thereof forming a seat for the O-ring.

4. The tube end fitting assembly of claim 1, and wherein said port is formed with a reduced bottom portion receiving said flange, O-ring and washer.

5. The tube end fitting assembly of claim 4, and wherein said bushing member has a reduced lower end portion received in the reduced bottom portion of said port.

6. The tube end fitting assembly of claim 5, and wherein said port bottom seat is flat.

7. The tube end fitting assembly of claim 6, and wherein said rigid washer member is flat and is substantially parallel to said port bottom seat.

8. The tube end fitting assembly of claim 1, and wherein said central bore has an enlarged lower portion receiving the upper portion of said sleevelike ferrule member.

9. The tube end fitting assembly of claim 1, and wherein the ring member has a cross section which normally is insufficient to fill the bottom portion of said port but which can be deformed responsive to tightening of the bushing member so as to substantially fill the space between the flange and the rigid washer member and transmits radial inward squeezing force on the ferrule member.

10. The tube end fitting assembly of claim 9, and wherein the ring member is of toroidal normal shape and has a circular normal cross-section and the ferrule member has an annular radius portion adjacent said flange forming a seat for the ring member.

* * * * *